(12) United States Patent
Jinkawa

(10) Patent No.: US 12,259,804 B2
(45) Date of Patent: Mar. 25, 2025

(54) PROGRAM DEVELOPMENT DEVICE, AND PROGRAM FOR PROVIDING PROGRAM DEVELOPMENT DEVICE

(71) Applicant: OMRON CORPORATION, Kyoto (JP)

(72) Inventor: Takeshi Jinkawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 269 days.

(21) Appl. No.: 17/765,303

(22) PCT Filed: Mar. 3, 2020

(86) PCT No.: PCT/JP2020/008950
§ 371 (c)(1),
(2) Date: Mar. 30, 2022

(87) PCT Pub. No.: WO2021/065033
PCT Pub. Date: Apr. 8, 2021

(65) Prior Publication Data
US 2022/0365864 A1    Nov. 17, 2022

(30) Foreign Application Priority Data

Oct. 3, 2019  (JP) .................................. 2019-183181

(51) Int. Cl.
G06F 11/36    (2006.01)
G06F 11/3604  (2025.01)
(52) U.S. Cl.
CPC .............................. *G06F 11/3616* (2013.01)

(58) Field of Classification Search
None
See application file for complete search history.

(56) References Cited

U.S. PATENT DOCUMENTS 7,275,236 B1    9/2007  Kabe
10,890,889 B2 *  1/2021  Thabuis ............... G05B 19/056
(Continued)

FOREIGN PATENT DOCUMENTS

CN    105283846 A    1/2016
CN    107193249 A    9/2017
(Continued)

OTHER PUBLICATIONS

International Search Report for PCT/JP2020/008950 dated Jun. 2, 2020 (PCT/ISA/210).
(Continued)

*Primary Examiner* — Andrew M. Lyons
(74) *Attorney, Agent, or Firm* — Sughrue Mion, PLLC

(57) ABSTRACT

A program development device provides a development environment of a user program executed by a control device. The program development device receives setting of an attribute related to reference from a program for each of one or more variables used in the user program including a first program and a second program having a calling relationship. The set attribute includes a first attribute referred to by any one of the first program and the second program and a second attribute referred to by both the first program and the second program. The program development device analyzes the user program and evaluates consistency based on the set attribute related to reference from the program for each of the one or more variables.

16 Claims, 15 Drawing Sheets

(56) References Cited

U.S. PATENT DOCUMENTS

| | | | |
|---|---|---|---|
| 2005/0203958 A1* | 9/2005 | Mitchell | G06F 9/4492 |
| 2008/0104096 A1* | 5/2008 | Doval | G06F 8/10 |
| | | | 707/999.102 |
| 2014/0005805 A1 | 1/2014 | Nishiyama et al. | |
| 2015/0025656 A1 | 1/2015 | Ono et al. | |
| 2016/0070246 A1 | 3/2016 | Nakagawa et al. | |
| 2016/0125037 A1 | 5/2016 | Iwamura | |
| 2017/0261970 A1 | 9/2017 | Fujimura et al. | |
| 2017/0262278 A1 | 9/2017 | Takuma | |
| 2018/0203428 A1 | 7/2018 | Thabuis | |
| 2018/0210415 A1 | 7/2018 | Unno et al. | |
| 2021/0286715 A1* | 9/2021 | Ono | G06F 11/3684 |

FOREIGN PATENT DOCUMENTS

| | | |
|---|---|---|
| CN | 107193250 A | 9/2017 |
| CN | 107615192 A | 1/2018 |
| EP | 2 597 566 A1 | 5/2013 |
| EP | 3 015 979 A1 | 5/2016 |
| EP | 3 336 627 A1 | 6/2018 |
| JP | 4-205355 A | 7/1992 |
| JP | 2006-099639 A | 4/2006 |
| JP | 2011-186999 A | 9/2011 |
| JP | 2012-194666 A | 10/2012 |
| JP | 2015-53022 A | 3/2015 |
| JP | 2016-91066 A | 5/2016 |
| WO | 2002/024853 A1 | 5/2002 |
| WO | 2002/042853 A1 | 5/2002 |
| WO | 2013/114926 A1 | 8/2013 |
| WO | 2017/026290 A1 | 2/2017 |

OTHER PUBLICATIONS

Written Opinion of the International Searching Authority for PCT/JP2020/008950 date Jun. 2, 2020 (PCT/ISA/237).
Extended European Search Report issued Oct. 4, 2023 in European Application No. 20872802.2.
Chinese Office Action dated Jul. 2, 2024 in Application No. 202080067892.0.
Chinese Office Action dated Jan. 30, 2024 in Application No. 202080067892.0.

* cited by examiner

FIG.9

| VARIABLE NAME | DATA TYPE | IO UNIT ASSIGNMENT | COMMENT | MODULE |
|---|---|---|---|---|
| InA_Bit00 | BOOL | INPUT UNIT A Bit00 | WHOLE CONTROL SWITCH | Parent |
| InB_Bit00 | BOOL | INPUT UNIT B Bit00 | PARTIAL ACTIVATION SWITCH | Child |
| Out_Bit00 | BOOL | OUTPUT UNIT Bit00 | ACTUATOR | Child |
| Child_REQ | BOOL | | Child OPERATION COMMAND | Parent, Child |
| Child_ACK | BOOL | | Child OPERATION TERMINATION | Parent, Child |
| Temp1 | INT | | CALCULATION WORK 1 | |
| Temp2 | REAL | | CALCULATION WORK 2 | |
| Temp3 | INT | | CALCULATION WORK 3 | |

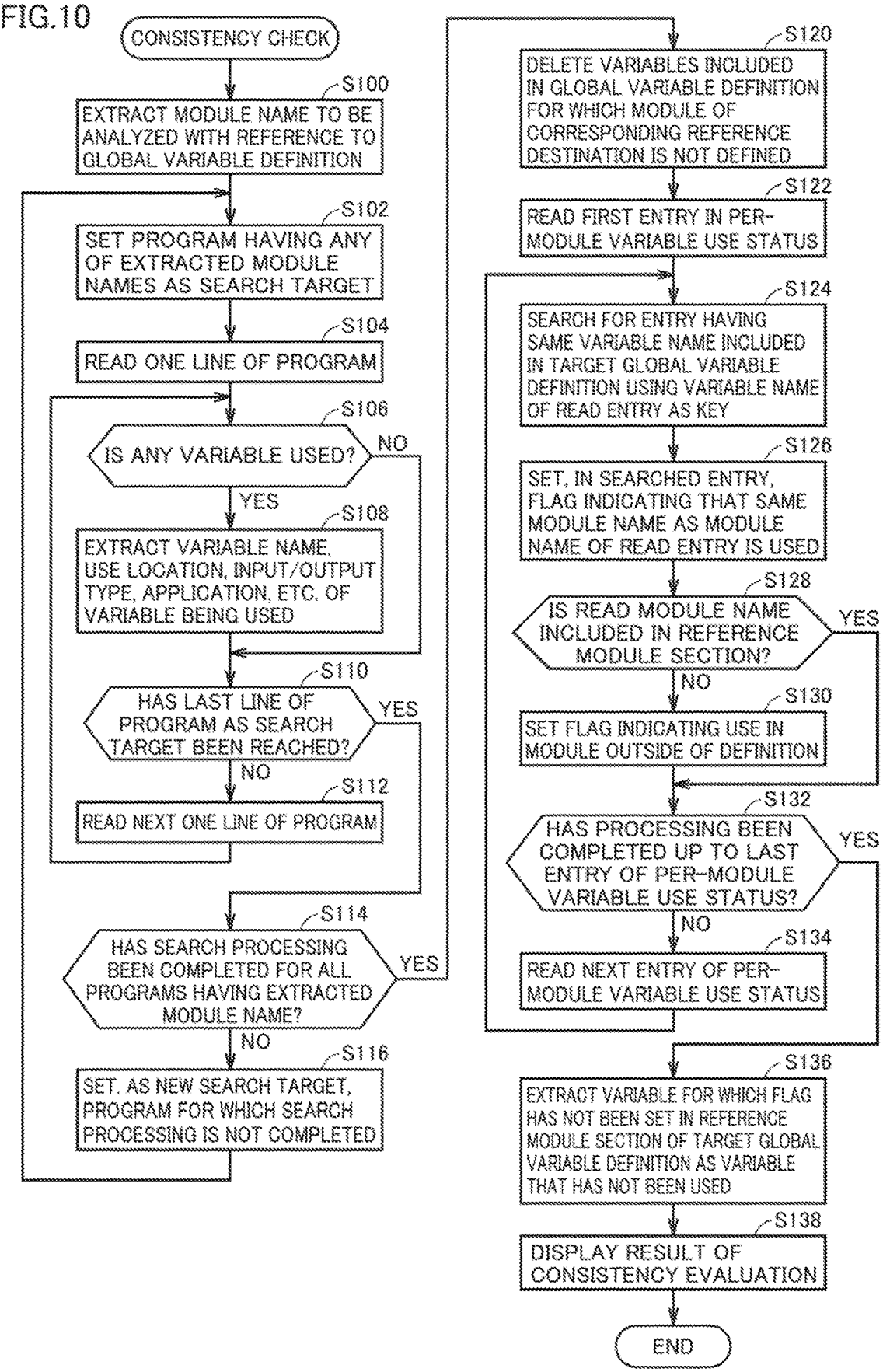

FIG.11

| MODULE NAME | VARIABLE NAME | USE LOCATION | INPUT/ OUTPUT | APPLICATION | NON- DEFINITION USE |
|---|---|---|---|---|---|
| Parent | InA_Bit00 | Step0 | INPUT | CONTACT | |
| Parent | Child_REQ | Step1 | OUTPUT | COIL | |
| Child | Child_REQ | Step0 | INPUT | CONTACT | |
| Child | Local1 | Step1 | OUTPUT | COIL | |
| Child | InA_Bit00 | Step2 | INPUT | CONTACT | |
| Child | Local2 | Step3 | OUTPUT | COIL | |
| Child | InB_Bit00 | Step4 | INPUT | CONTACT | |
| Child | Out_Bit00 | Step5 | OUTPUT | COIL | |
| Child | Local3 | Step6 | INPUT | CONTACT | |
| Child | Child_ACK | Step7 | OUTPUT | COIL | |

FIG.12

| VARIABLE NAME | DATA TYPE | IO UNIT ASSIGNMENT | COMMENT | MODULE | |
|---|---|---|---|---|---|
| InA_Bit00 | BOOL | INPUT UNIT A Bit00 | WHOLE CONTROL SWITCH | ☐ Parent | |
| InB_Bit00 | BOOL | INPUT UNIT B Bit00 | PARTIAL ACTIVATION SWITCH | ☐ Child | |
| Out_Bit00 | BOOL | OUTPUT UNIT Bit00 | ACTUATOR | ☐ Child | |
| Child_REQ | BOOL | | Child OPERATION COMMAND | ☐ Parent | ☐ Child |
| Child_ACK | BOOL | | Child OPERATION TERMINATION | ☐ Parent | ☐ Child |

USED VARIATION — 300

| 311 MODULE NAME | 312 VARIABLE NAME | 313 DATA TYPE | 314 IO UNIT ASSIGNMENT | 315 COMMENT | 316 APPLICATION | 317 CHECK RESULT |
|---|---|---|---|---|---|---|
| Parent | InA_Bit00 | BOOL | INPUT UNIT A Bit00 | WHOLE CONTROL SWITCH | INPUT | |
| Parent | Child_REQ | BOOL | | Child OPERATION COMMAND | OUTPUT | |
| Child | InA_Bit00 | BOOL | INPUT UNIT A Bit00 | PARTIAL ACTIVATION SWITCH | INPUT | USE NOT IN MODULE DEFINITION |
| Child | InB_Bit00 | BOOL | INPUT UNIT B Bit00 | PARTIAL ACTIVATION SWITCH | INPUT | |
| Child | Out_Bit00 | BOOL | OUTPUT UNIT Bit00 | ACTUATOR | OUTPUT | |
| Child | Child_REQ | BOOL | | Child OPERATION TERMINATION | INPUT | |
| Child | Child_ACK | BOOL | | Child OPERATION TERMINATION | OUTPUT | |

UNUSED VARIATION — 320

| 321 MODULE NAME | 322 VARIABLE NAME | 323 DATA TYPE | 324 IO UNIT ASSIGNMENT | 325 COMMENT | 326 APPLICATION | 327 CHECK RESULT |
|---|---|---|---|---|---|---|
| Parent | Child_ACK | BOOL | | Child OPERATION COMMAND | – | NOT USED IN DEFINED MODULE |

FIG.14

| VARIABLE NAME | DATA TYPE | IO UNIT ASSIGNMENT | COMMENT | MODULE | | | | CHECK RESULT |
|---|---|---|---|---|---|---|---|---|
| | | | | Parent | | Child | | |
| | | | | DEFINITION | USE | DEFINITION | USE | |
| InA_Bit00 | BOOL | INPUT UNIT A Bit00 | WHOLE CONTROL SWITCH | [✓] | [R] | ///// | //[R]// | USE NOT IN MODULE DEFINITION |
| InB_Bit00 | BOOL | INPUT UNIT B Bit00 | PARTIAL ACTIVATION SWITCH | [ ] | [ ] | [✓] | [R] | ACCESS TO UNITS IN PLURALITY OF MODULES |
| Out_Bit00 | BOOL | OUTPUT UNIT Bit00 | ACTUATOR | [ ] | [ ] | [✓] | [W] | |
| Child_REQ | BOOL | | Child OPERATION COMMAND | [✓] | [W] | [✓] | [R] | |
| Child_ACK | BOOL | | Child OPERATION TERMINATION | //[✓]// | //[W]// | [✓] | [W] | NOT USED IN DEFINED MODULE |

FIG.15
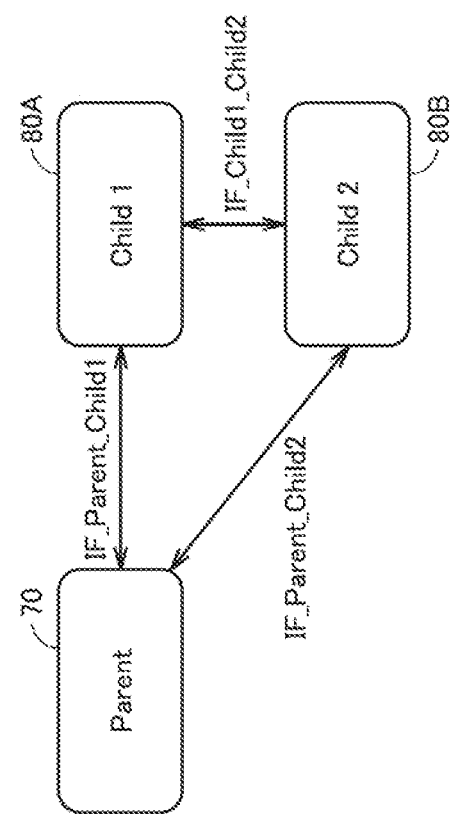
PARENT-CHILD RELATIONSHIP OF MODULE
(A)
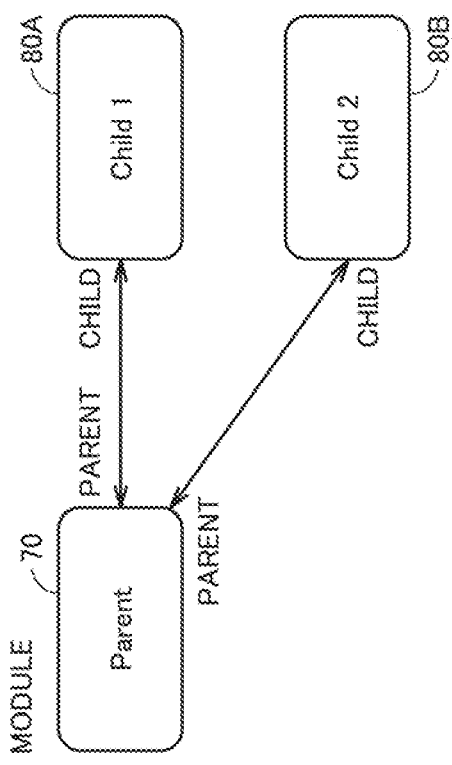
INTER-PROGRAM I/F
(B)

PROGRAM DEVELOPMENT DEVICE, AND PROGRAM FOR PROVIDING PROGRAM DEVELOPMENT DEVICE

CROSS REFERENCE TO RELATED APPLICATIONS

This application is a National Stage of International Application No. PCT/JP2020/008950 filed Mar. 3, 2020, claiming priority based on Japanese Patent Application No. 2019-183181 filed Oct. 3, 2019, the contents of each of which being herein incorporated by reference in their entireties.

TECHNICAL FIELD

The present invention relates to a program development device, and a program for providing the program development device.

BACKGROUND ART

With an increase in functionality of control devices such as programmable logic controllers (PLCs) that form the basis of factory automation (FA), an application program called a user program has also been increased in scale. There is also a need to increase design efficiency and reusability of the program with the increase in the scale of the program.

Since the user program executed by the control device includes an instruction to refer to a signal (I/O signal) exchanged with a field device group, it is necessary to appropriately correct the instruction to refer to the IO signal and the like for reuse.

For example, Japanese Patent Application Laying-Open No. H04-205355 (PTL 1) discloses a technique that is not directed to a control device, but analyzes variable use restriction information for a common variable in a source program, accumulates the restriction information, checks use of a variable in the source program with reference to the accumulated restriction information, and finding erroneous use for the common variable in a stage of the source program.

CITATION LIST

Patent Literature

PTL 1: Japanese Patent Laying-Open No. H04-205355

SUMMARY OF INVENTION

Technical Problem

The technique disclosed in PTL 1 merely focuses on the common variable used in the source program, and cannot achieve the object of improving the design efficiency and reusability of the program in the control device such as the PLC.

One object of the present invention is to provide a new mechanism capable of improving design efficiency and reusability of a user program executed by a control device.

Solution to Problem

In an embodiment of the present invention, there is provided a program development device that provides a development environment of a user program executed by a control device. The program development device includes a setting means that receives setting of an attribute related to reference from a program for each of one or more variables used in the user program including a first program and a second program having a calling relationship. The set attribute includes a first attribute referred to by any one of the first program and the second program and a second attribute referred to by both the first program and the second program. The program development device includes an evaluation means that analyzes the user program and evaluates consistency based on the set attribute related to reference from the program for each of the one or plurality of variables.

In this configuration, the attribute of the variable referred to by each of the first program and the second program having a calling relationship is set in advance, and it is possible to ensure that a use mode is adapted to the set attribute. This makes it possible to create a user program with high reusability.

The evaluation of consistency by the evaluation means may include whether a variable in which the first attribute is set is referred to by a program different from a reference source program. This configuration can prevent a variable determined to be referred to by a specific program from being referred to by another program.

The evaluation of consistency by the evaluation means may include whether a variable in which the second attribute is set is referred to by both the first program and the second program. This configuration can prevent a variable determined to be referred to by the plurality of programs from being referred to by only some of the programs.

The program development device may further include a result presentation means configured to present an evaluation result of consistency by the evaluation means. This configuration allows the user to appropriately modify the user program or the like with reference to the evaluation result of the consistency.

The result presentation means may display the variable evaluated as not satisfying consistency by the evaluation means in a mode different from other variables. This configuration allows a variable that does not satisfy consistency to be easily identified.

The result presentation means may present which type of input or output each of the one or plurality of variables is used in the user program. In this configuration, it is possible to determine whether the variable is appropriately used for each use type of the variable.

The variable in which the first attribute is set may be associated with a specific IO unit. This configuration allows setting suitable for a variable that refers to a value of an IO unit.

The setting means may receive setting of a program to be used for each of the one or plurality of variables. In this configuration, an appropriate attribute can be set only by setting a program to be used without being conscious of a difference in the attribute.

Each of the first program and the second program, including a variable to be used and an attribute set for the variable, may be modularized. This configuration facilitates reuse in a modularized unit.

In another embodiment of the present invention, there is provided a program that provides a program development device that provides a development environment of a user program executed by a control device. The program causes a computer to receive setting of an attribute related to reference from a program for each of one or more variables used in the user program including a first program and a second program having a calling relationship. The set attribute includes a first attribute referred to by any one of the first program and the second program and a second attribute referred to by both the first program and the second program. The program causes the computer to analyze the user program and evaluates consistency based on the set attribute related to reference from the program for each of the one or plurality of variables.

In this configuration, the attribute of the variable referred to by each of the first program and the second program having a calling relationship is set in advance, and it is possible to ensure that a use mode is adapted to the set attribute. This makes it possible to create a user program with high reusability.

Advantageous Effects of Invention

The present invention can achieve a new mechanism capable of improving design efficiency and reusability of a user program executed by a control device.

BRIEF DESCRIPTION OF DRAWINGS

FIG. 9 is a diagram illustrating an example of a global variable definition used in the modular programming according to the embodiment.

FIG. 10 is a flowchart illustrating a processing procedure of consistency evaluation in the modular programming according to the embodiment.

FIG. 11 is a diagram illustrating an example of a per-module variable use status generated by processing of the consistency evaluation illustrated in FIG. 10.

FIG. 12 is a diagram illustrating an example of a target global variable definition generated in the modular programming according to the embodiment.

FIG. 13 is a schematic diagram illustrating an example of a result of the consistency evaluation provided by the program development device according to the embodiment.

FIG. 14 is a schematic diagram illustrating another example of the result of the consistency evaluation provided by the program development device according to the embodiment.

FIG. 15 is a diagram illustrating an example of an inter-module interface in a modular programming according to a modification of the embodiment.

DESCRIPTION OF EMBODIMENTS

Figure 1:
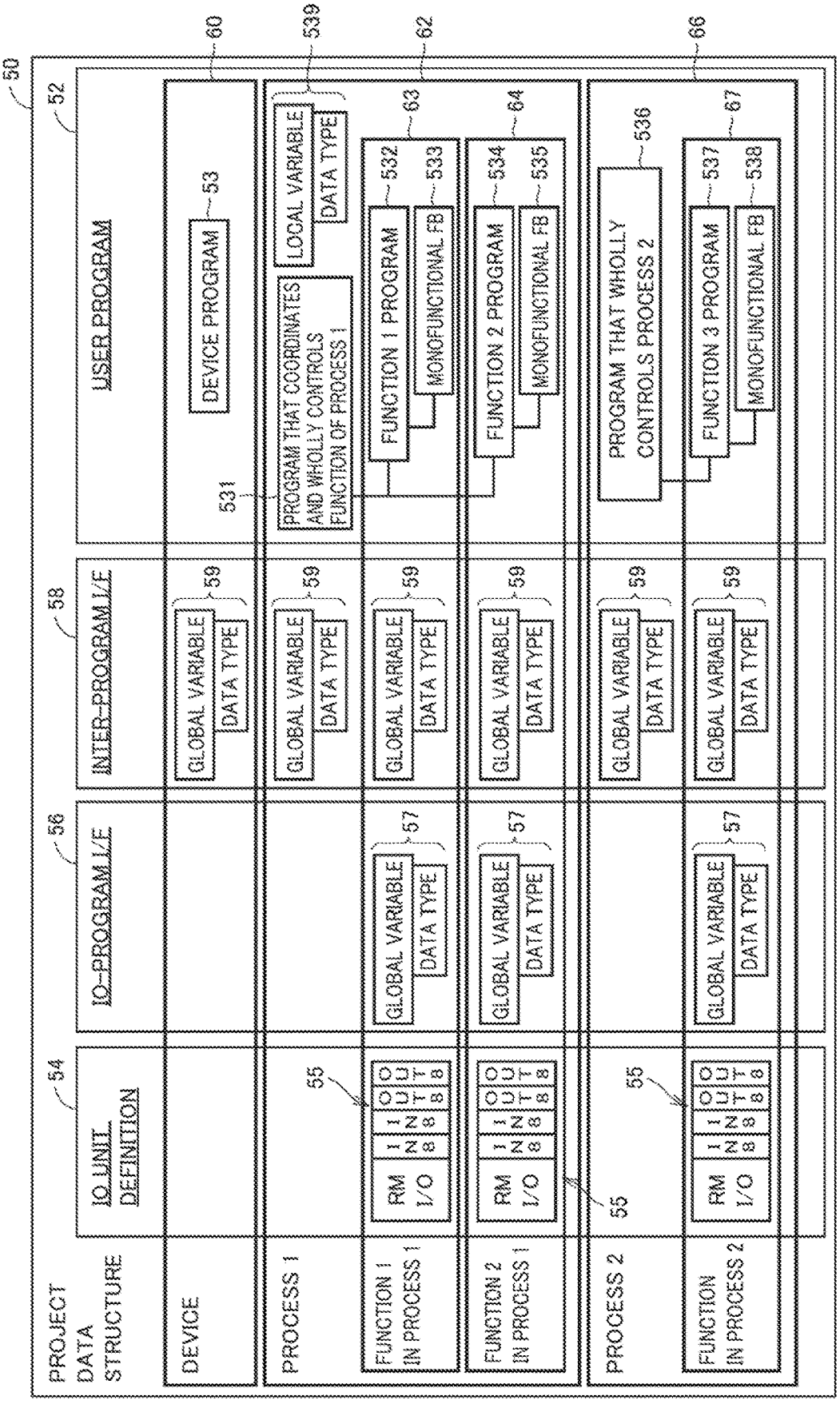
FIG. 1 is a schematic diagram illustrating an example of a data structure of a project created in modular programming according to the embodiment.

Hereinafter, an embodiment of the present invention will be described with reference to the drawings. The same or corresponding parts in the drawings are denoted by the same reference signs, and the description thereof will not be repeated.

A. Application Example: Modular Programming

First, an example of a situation to which the present invention is applied will be described. Specifically, modular programming according to the embodiment will be schematically described. As will be described later, the term "modular programming" means that programs and settings are defined as modules and are scheduled to be reused on a module-by-module basis. However, the technical idea of the present invention is not applied only to modular programming but is applicable to a user program including a plurality of programs.

In IEC 61131-3 defined by the International Electrotechnical Commission (IEC), blocks constituting programs and projects are referred to as program organization units (POUs). The POU corresponds to a unit of a group of program elements. In the user program, a calling relationship (hereinafter, the parent-child relationship is also referred to as "parent-child relationship" or "parent-child") between POUs such as calling another POU from a certain POU can be defined.

By using a POU as a unit of a module, the parent-child relationship between modules can be represented, but a control device or a control system acquires an input signal from an input device via an IO unit and controls an output device in accordance with control calculation based on the acquired input signal. Therefore, the number of IO signals is much larger than that of a general-purpose computer, and a global variable (indicating a value of the IO signal) assigned to the IO unit is accessible from the POU of any layer. Therefore, an IO-program interface (IO-program I/F) that enables each program to access the global variable assigned to the IO unit is prepared.

In addition, in a case where a program structure that allows only a strict calling relationship (that is, the calling relationship is defined only by an input variable and an output variable managed by each POU) is adopted as an interface between the POUs, the reusability of the program decreases, and thus, an interface between modules (inter-program interface (inter-program I/F)) that defines global variables accessible by each POU is prepared.

FIG. 1 is a schematic diagram illustrating an example of a data structure of a project created in the modular programming according to the embodiment. Referring to FIG. 1, a project 50 includes a user program 52, an IO unit definition 54, an IO-program I/F 56, and an inter-program I/F 58 as elements.

In general, a global variable indicating an IO signal exchanged by an IO unit is defined in I/O-program I/F 56. Typically, a variable set in IO-program I/F 56 is associated with a specific IO unit. On the other hand, a global variable that can be referred to by each program is defined in inter-program I/F 58.

In project 50 illustrated in FIG. 1, modules corresponding to characteristics of a control target are defined. Specifically, project 50 includes a device module 60 and process modules 62 and 66. Process module 62 further includes in-process modules 63 and 64 corresponding to respective functions in a process. Each of the modules includes a program element that belongs to each of user program 52, IO unit definition 54, IO-program I/F 56, and inter-program I/F 58. That is, each program included in project 50, including a variable to be used and an attribute set for the variable, is modularized.

Specifically, device module 60 includes a device program 53 for controlling a device included in the control target as user program 52, and includes a global variable definition 59 as inter-program I/F 58. Global variable definition 59 includes definitions of available global variable names and definitions of data types for global variable names (hereinafter, the same applies to other global variables and local variables).

Note that, a "local variable" herein means a variable that can be referred to only in a program that defines the local variable, and a "global variable" means a variable other than the "local variable". In the following description, "global variable" is a term that encompasses a variable that can be referred to by one or more programs or IO units, and the modifier "global" should not be interpreted in a strict sense.

Process module 62 includes, as user program 52, a program 531 that coordinates and wholly controls the function of the process and a local variable definition 539, and also includes global variable definition 59 as inter-program I/F 58.

In-process module 63 included in process module 62 includes, as user program 52, a function program 532 and a function block 533 called from function program 532, and includes global variable definition 59 as inter-program I/F 58. Further, in-process module 63 includes a global variable definition 57 as IO-program I/F 56 and IO unit setting 55 as IO unit definition 54.

Similarly, in-process module 64 included in process module 62 includes, as user program 52, a function program 534 and a function block 535 called from function program 534, and includes global variable definition 59 as inter-program I/F 58. Further, in-process module 64 includes global variable definition 57 as IO-program I/F 56 and IO unit setting 55 as IO unit definition 54.

Process module 66 includes, as user program 52, a program 536 that wholly controls the process, and includes global variable definition 59 as inter-program I/F 58.

In-process module 67 included in process module 66 includes, as user program 52, a function program 537 and a function block 538 called from function program 537, and includes global variable definition 59 as inter-program I/F 58. Further, in-process module 67 includes global variable definition 57 as IO-program I/F 56 and IO unit setting 55 as IO unit definition 54.

As for global variable definitions 57 and 59, refer to FIG. 9 and the like described later.

For example, assuming that a specific module (program, variable definition, and IO definition for specific process) included in project 50 illustrated in FIG. 1 is reused, not only the program included in user program 52 but also elements included in IO unit definition 54, IO-program I/F 56, and inter-program I/F 58 need to be considered at the time of reuse.

The variable referred to only by the specific program included in user program 52 exists as the global variable of IO-program I/F 56, and the variable cross-referred between a plurality of programs exists as the global variable of inter-program I/F 58. However, since there is no information related to such a difference in handling of variables in the definition of variables in IEC 61131-3, there is a possibility that variables cannot be appropriately handled at a design stage of the user program.

Therefore, in the modular programming according to the embodiment, it is possible to set any attribute (or rule) of reference to a variable only by a specific program or reference to a variable among a plurality of programs, and it is possible to evaluate consistency based on the set attribute. Note that an attribute different from the above attributes may be set as a variable.

Figure 2:
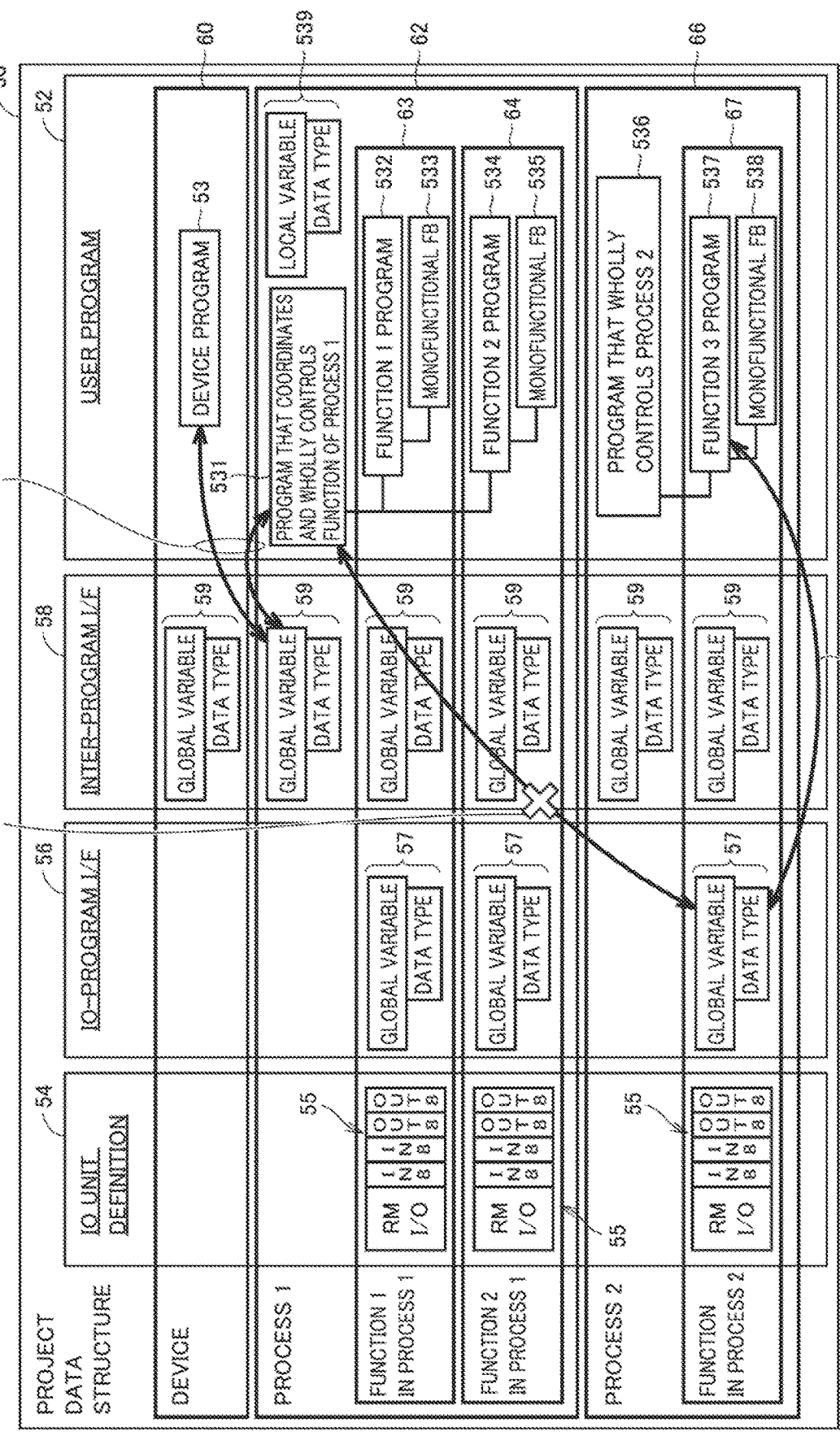
FIG. 2 is a diagram for describing handling of variables in the modular programming according to the embodiment.

FIG. 2 is a diagram for describing handling of variables in the modular programming according to the embodiment. Referring to FIG. 2, the global variable belonging to IO-program I/F 56 is permitted to be referred to only by a specific program, and the global variable belonging to inter-program OF 58 is permitted to be referred to by a plurality of programs.

In the modular programming according to the embodiment, which attribute each global variable has is set in advance, and whether each global variable matches the set attribute is evaluated.

Furthermore, the global variable belonging to inter-program I/F 58 can also be required to be referred to by a plurality of target programs. That is, it is also possible to determine as inconsistent when the global variable is not referred to by any of the plurality of target programs.

By setting attributes and consistency evaluation for the variables as described above, it is possible to achieve a new mechanism capable of improving design efficiency and reusability of the user program.

B. Configuration Example of Control System

Next, a description will be made of a configuration example of a control system 1 in which a user program created by a program development device 200 according to the embodiment is executed.

Figure 3:
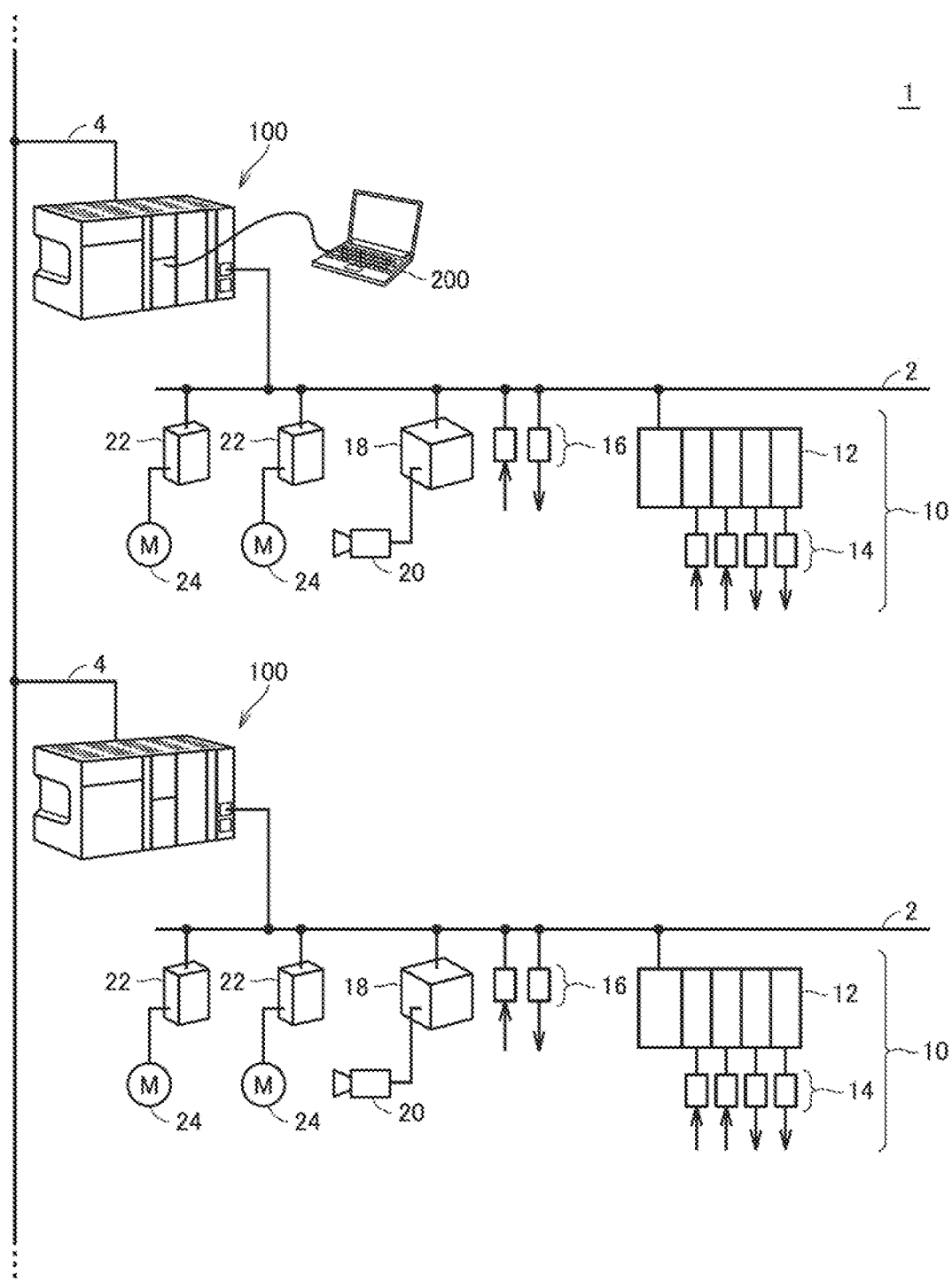
FIG. 3 is a schematic diagram illustrating an overall configuration example of a control system according to the embodiment.

FIG. 3 is a schematic diagram illustrating an overall configuration example of control system 1 according to the embodiment. Referring to FIG. 3, control system 1 includes one or more control devices 100. Although FIG. 3 illustrates control system 1 including two control devices 100, control system 1 may include one control device 100.

Each of control devices 100 executes control calculation for controlling the control target and executes abnormality detection processing for detecting any abnormality that may occur in a monitoring target included in the control target. Control device 100 may be embodied as a kind of computer such as a programmable logic controller (PLC).

Control device 100 is connected to a field device group 10 via a field bus 2. Control devices 100 are connected to each other via a local network 4. Program development device 200 may be connected to control device 100.

As field bus 2, it is preferable to adopt a network that perform constant cycle communication that guarantees arrival time of data. EtherCAT (registered trademark) and the like are known as a network that performs such constant cycle communication.

Control device 100 collects data (hereinafter, also referred to as an "input value") acquired by field device group 10 and transferred to control device 100. Field device group 10 includes a device that collects a state value of a control target or a manufacturing device related to control, a production line, and the like (hereinafter, collectively referred to as "field") as an input value.

The "state value" is herein a term including a value that can be observed by an arbitrary control target (including the monitoring target), and can include, for example, a physical value that can be measured by an arbitrary sensor, an ON or OFF state of a relay, a switch, or the like, a command value such as a position, a speed, or a torque given by the PLC to a servo driver, a variable value used by the PLC for calculation, or the like.

As a device that collects such a state value, an input relay, various sensors, and the like are assumed. Field device group 10 further includes a device that exerts some action to the field on the basis of the command value (hereinafter, also referred to as an "output value") generated by control device 100. As a device that exerts some action on such a field, an output relay, a contactor, a servo driver, a servomotor, and other arbitrary actuators are assumed. Field device group 10 exchanges data including an input value and an output value with control device 100 via field bus 2.

In the configuration example illustrated in FIG. 3, field device group 10 includes a remote input/output (IO) device 12, a relay group 14, an image sensor 18, a camera 20, a servo driver 22, and a servomotor 24.

Remote IO device 12 includes a communication unit that performs communication via field bus 2 and an input/output unit (hereinafter, also referred to as an "IO unit") that collects an input value and outputs an output value. An input value and an output value are exchanged between control device 100 and field via such an IO unit. FIG. 3 illustrates an example in which a digital signal is exchanged as an input value and an output value via relay group 14.

The IO unit may be directly connected to the field bus. FIG. 3 illustrates an example in which an IO unit 16 is directly connected to field bus 2.

Image sensor 18 performs image measurement processing such as pattern matching on an image data captured by camera 20, and transmits a processing result to control device 100.

Servo driver 22 drives servomotor 24 in accordance with an output value (for example, a position command or the like) from control device 100.

Program development device 200 provides a development environment of a user program executed by control device 100. A user operates program development device 200 to create the user program to be executed by control device 100. Specifically, program development device 200 provides the development environment (program creation and editing tool, parser, compiler, and the like) of the user program executed by control device 100, a function of determining setting parameters (configurations) of control device 100 and various devices connected to control device 100, a function of transmitting the created user program to control device 100, a function of correcting and modifying online the user program executed on control device 100, and the like.

Program development device 200 according to the embodiment can not only enhance the reusability in the user program executed by one control device 100, but also enhance the reusability between the user programs executed by the plurality of control devices 100.

C. Hardware Configuration Example

Next, a description will be made of a hardware configuration example of control device 100 and program development device 200 constituting control system 1 according to the embodiment.

c1: Hardware Configuration Example of Control Device 100

Figure 4:
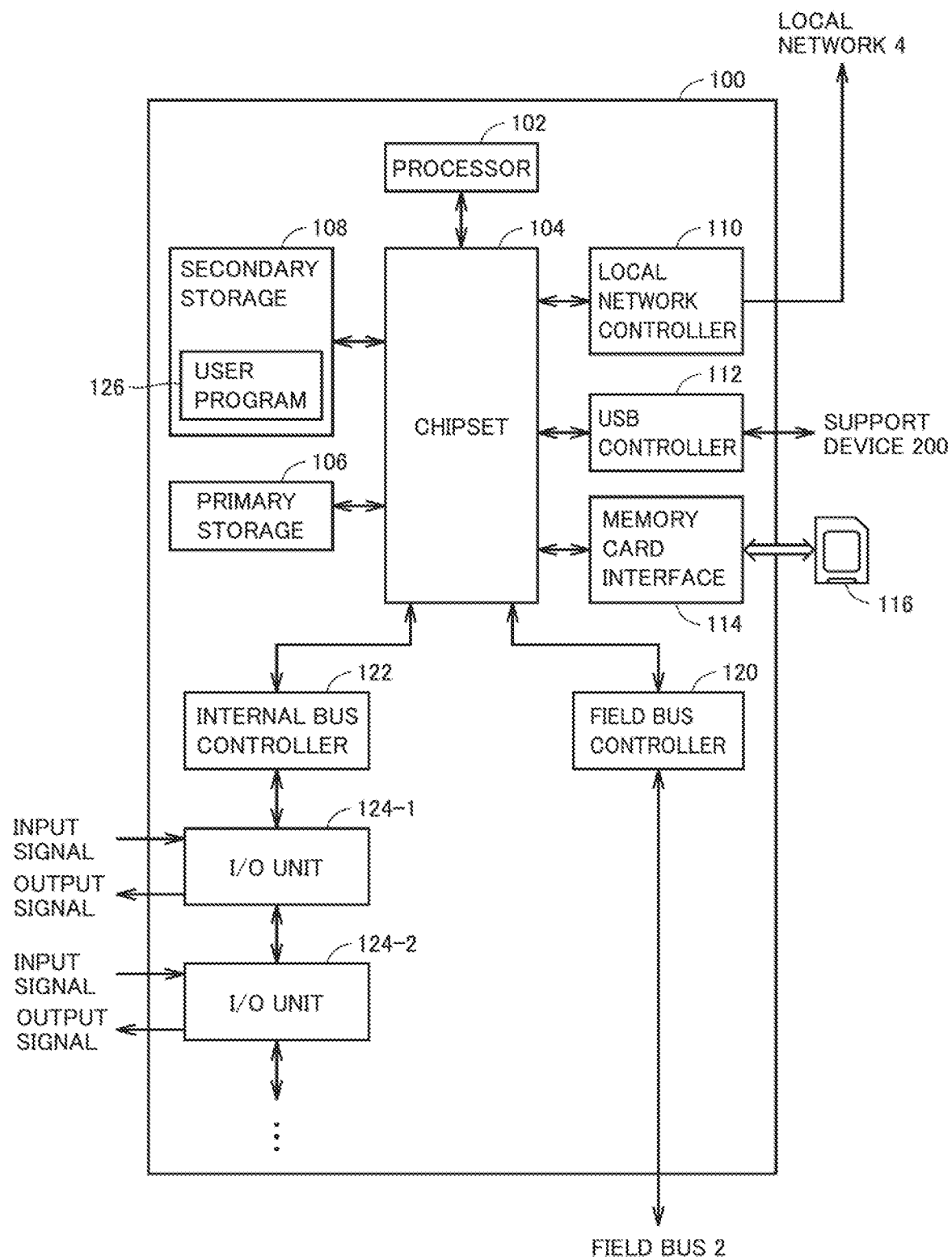
FIG. 4 is a block diagram illustrating a hardware configuration example of a control device constituting the control system according to the embodiment.

FIG. 4 is a block diagram illustrating a hardware configuration example of control device 100 constituting control system 1 according to the embodiment. Referring to FIG. 4, control device 100 includes a processor 102 such as a central processing unit (CPU) or a micro-processing unit (MPU), a chipset 104, a primary storage 106, a secondary storage device 108, a local network controller 110, a universal serial bus (USB) controller 112, a memory card interface 114, a field bus controller 120, an internal bus controller 122, and IO units 124-1, 124-2, and the like.

Processor 102 reads various programs stored in secondary storage device 108, develops the programs in primary storage 106, and executes the programs to implement control according to the control target and various processing as described later. Chipset 104 controls each component with processor 102, and thus provides the processing of control device 100 as a whole.

Secondary storage device 108 stores an executable user program 126 (corresponding to a control program) created by program development device 200 in addition to a system program (not illustrated).

Local network controller 110 controls data exchange with other devices via local network 4. USB controller 112 controls data exchange with program development device 200 via USB connection.

A memory card 116 is attachable to and detachable from memory card interface 114, and memory card interface 114 can write data to memory card 116 or read various data such as the user program and trace data from memory card 116.

Field bus controller 120 controls data exchange with other devices via field bus 2. Internal bus controller 122 is an interface that exchanges data with IO units 124-1, 124-2, and the like mounted on control device 100.

Although FIG. 4 illustrates the configuration example in which necessary functions are provided by processor 102 executing a program code, some or all of these provided functions may be implemented by using a dedicated hardware circuit (for example, an application specific integrated circuit (ASIC), a field-programmable gate array (FPGA), or the like). Alternatively, a main part of control device 100 may be implemented by using hardware according to a general-purpose architecture (for example, an industrial personal computer based on a general-purpose personal computer).

c2: Hardware Configuration Example of Program Development Device 200

Figure 5:
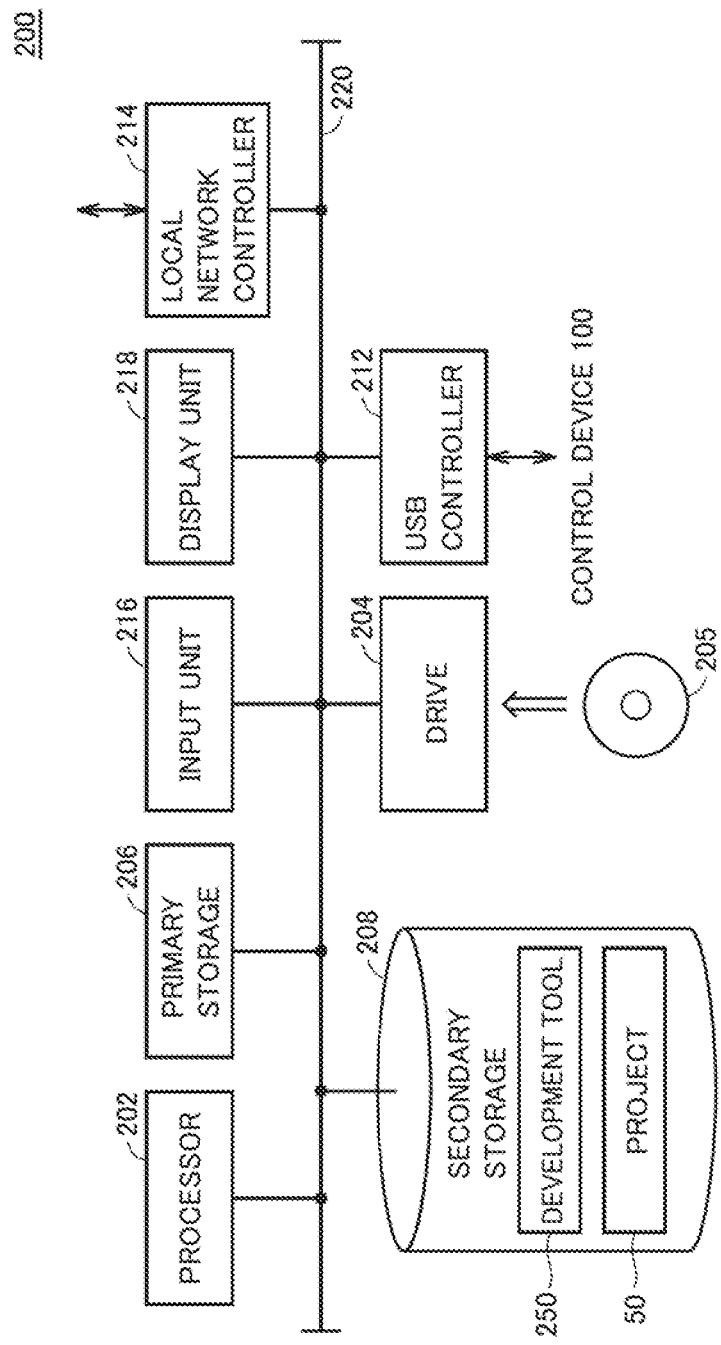
FIG. 5 is a block diagram illustrating a hardware configuration example of a program development device constituting the control system according to the embodiment.

FIG. 5 is a block diagram illustrating a hardware configuration example of program development device 200 constituting control system 1 according to the embodiment. For example, program development device 200 may be implemented by executing a program using hardware according to a general-purpose architecture (for example, a general-purpose personal computer).

Referring to FIG. 5, program development device 200 includes a processor 202 such as a CPU or an MPU, a drive 204, a primary storage 206, a secondary storage device 208, a USB controller 212, a local network controller 214, an input unit 216, and a display unit 218. These components are connected via a bus 220.

Processor 202 reads various programs stored in secondary storage device 208, develops the programs in primary storage 206, and executes the programs to implement various processing as described later.

Secondary storage device 208 includes, for example, a hard disk drive (HDD), a solid state drive (SSD), or the like. Secondary storage device 208 stores a development tool 250 for achieving various functions as described later. Secondary storage device 208 may store an OS and other necessary system programs.

Drive 204 can write data to a storage medium 205 and read various data (user program and various data) from storage medium 205. Storage medium 205 includes, for example, storage medium 205 (for example, an optical storage medium such as a digital versatile disc (DVD)) that non-transiently stores a computer-readable program.

Development tool 250 executed by program development device 200 may be installed via computer-readable storage medium 205, or may be installed by being downloaded from a server device or the like on a network. In some cases, a function provided by program development device 200 according to the embodiment is implemented by using a part of modules provided by the OS.

USB controller 212 controls data exchange with control device 100 via USB connection. Local network controller 214 controls data exchange with other devices via an arbitrary network.

Input unit 216 includes a keyboard, a mouse, and the like, and receives a user operation. Display unit 218 includes a display, various indicators, and the like, and outputs processing results and the like from processor 202. A printer may be connected to program development device 200.

Although FIG. 5 illustrates the configuration example in which necessary functions are provided by processor 202 executing the program code, some or all of these provided functions may be implemented by using a dedicated hardware circuit (for example, ASIC or FPGA).

D. Design and Consistency Evaluation of User Programming

Next, a description will be made of a design example and consistency evaluation of the user program according to the modular programming of the embodiment.

d1: Overall Processing Procedure

Figure 6:
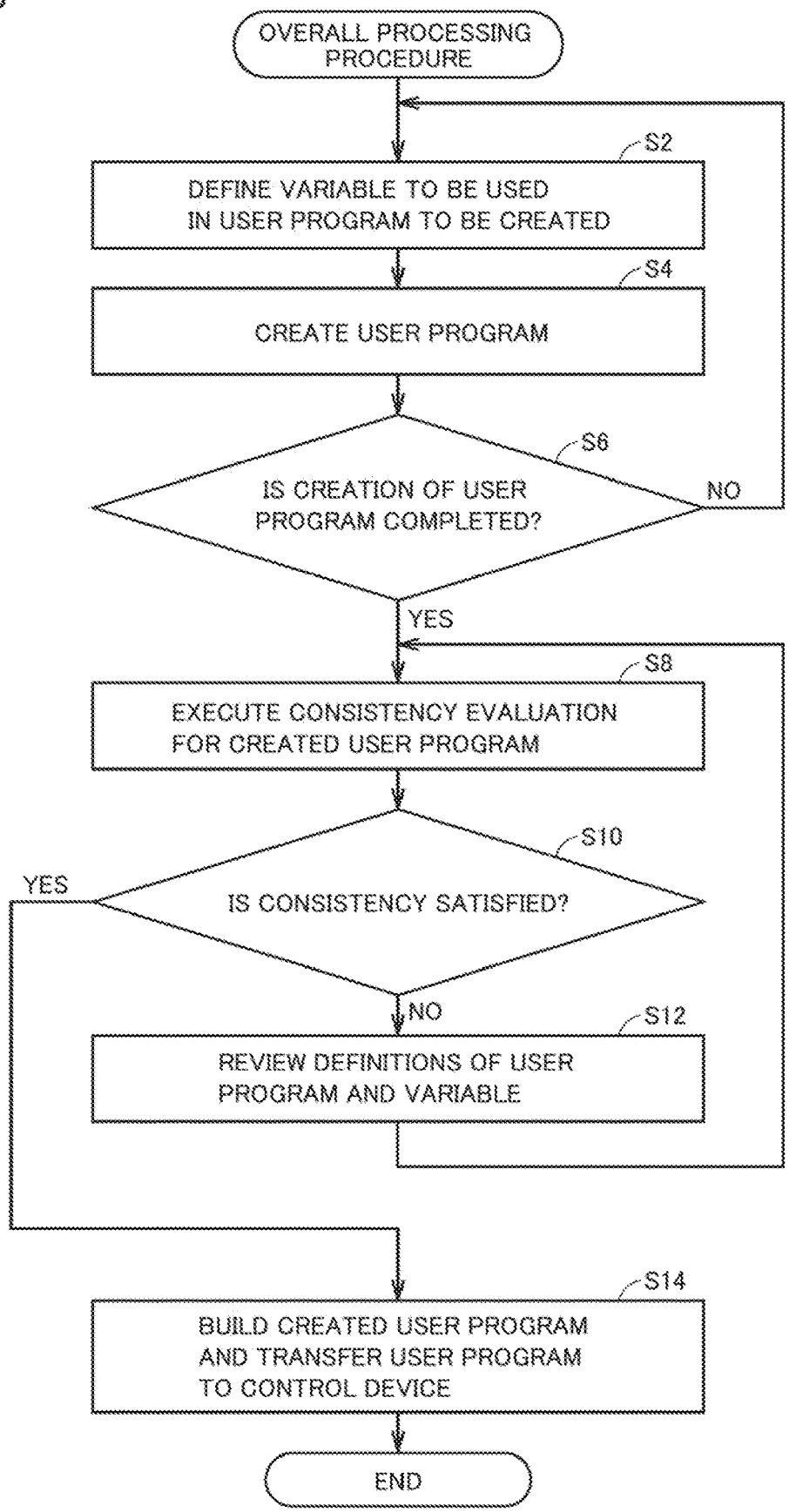
FIG. 6 is a flowchart illustrating an overall processing procedure of the modular programming according to the embodiment.

FIG. 6 is a flowchart illustrating an overall processing procedure of the modular programming according to the embodiment. Referring to FIG. 6, the user operates program development device 200 to define a variable to be used in the user program to be created (step S2). Then, the user operates program development device 200 to create the user program (step S4).

The processing of steps S2 and S4 is repeatedly executed until the creation of the user program is completed (NO in step S6).

When the creation of the user program is completed (YES in step S6), the user executes consistency evaluation for the created user program (step S8). When the consistency is not satisfied (NO in step S10), the user reviews the definitions of the user program and the variable (step S12). Then, the user executes the processing of step S8 and subsequent steps again.

When the consistency is satisfied (YES in step S10), the user builds the created user program and transfers the user program to control device 100 (step S14). Then, the processing of creating the user program is completed.

d2: Design Example of Project 50

Figure 7:
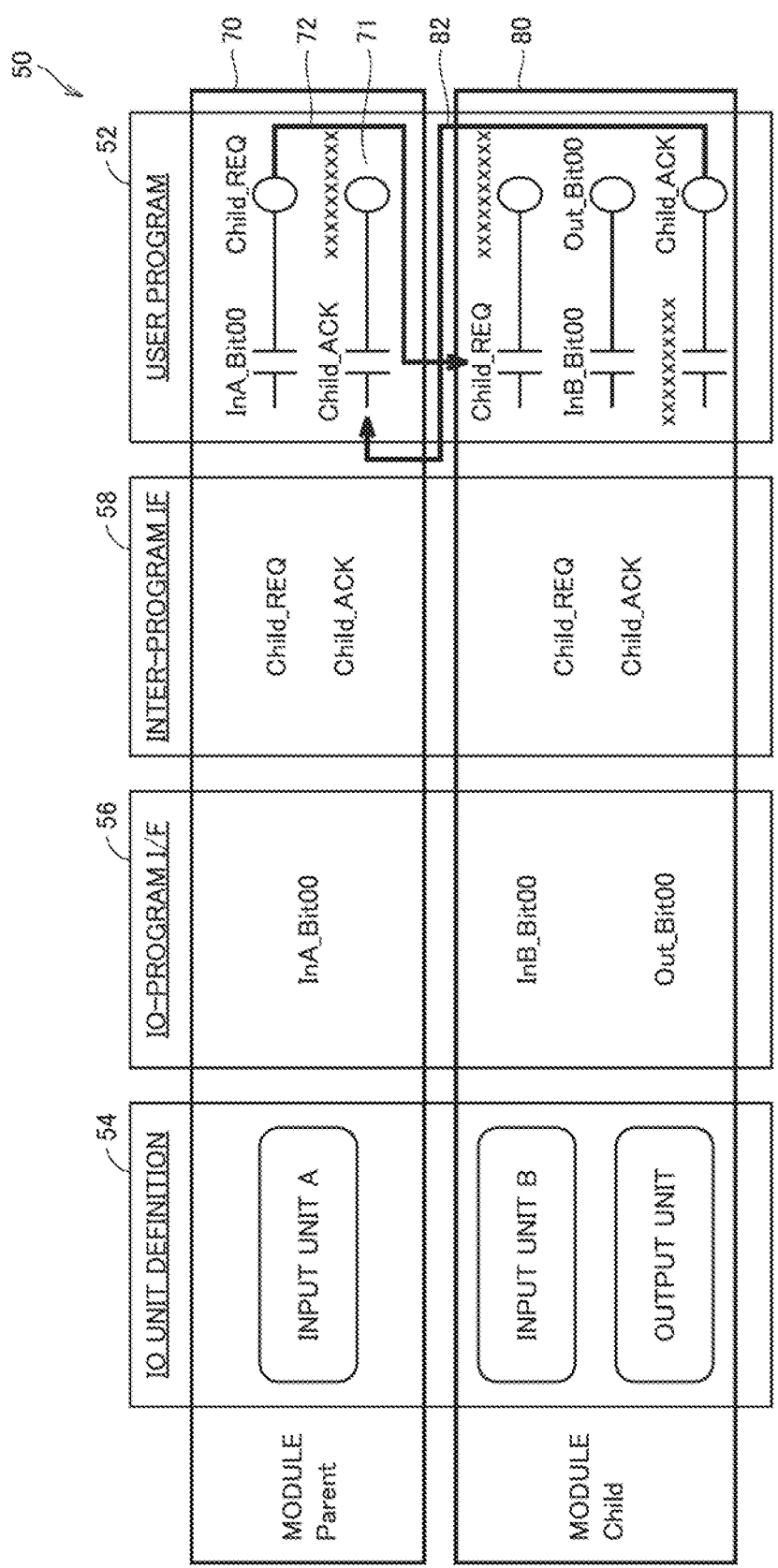
FIG. 7 is a diagram illustrating an example of a project created in the modular programming according to the embodiment.

FIG. 7 is a diagram illustrating an example of project 50 created in the modular programming according to the embodiment. Project 50 illustrated in FIG. 7 includes two modules (a parent module 70 (parent) and a child module 80 (child)) having a calling relationship (parent-child relationship). Parent module 70 includes an instruction to receive an input signal from an input unit A and activate child module 80. Child module 80 includes an instruction to receive an activation instruction from parent module 70, execute processing, and then output a processing result to an output unit. As described above, the user program includes a plurality of programs having a calling relationship.

Two variables "Child_REQ" and "Child_ACK" that can be referred to by both parent module 70 and child module 80 are defined in inter-program I/F 58. These variables are used in transfers 72 and 82 for activation and termination from parent module 70 to child module 80.

Further, a variable "InA_Bit00" indicating the input signal of input unit A is defined in IO-program I/F 56 of parent module 70, and a variable "InB_Bit00" indicating an input signal of an input unit B and a variable "Out_Bit00" indicating an output signal of the output unit are defined in IO-program I/F 56 of child module 80.

Figure 8:
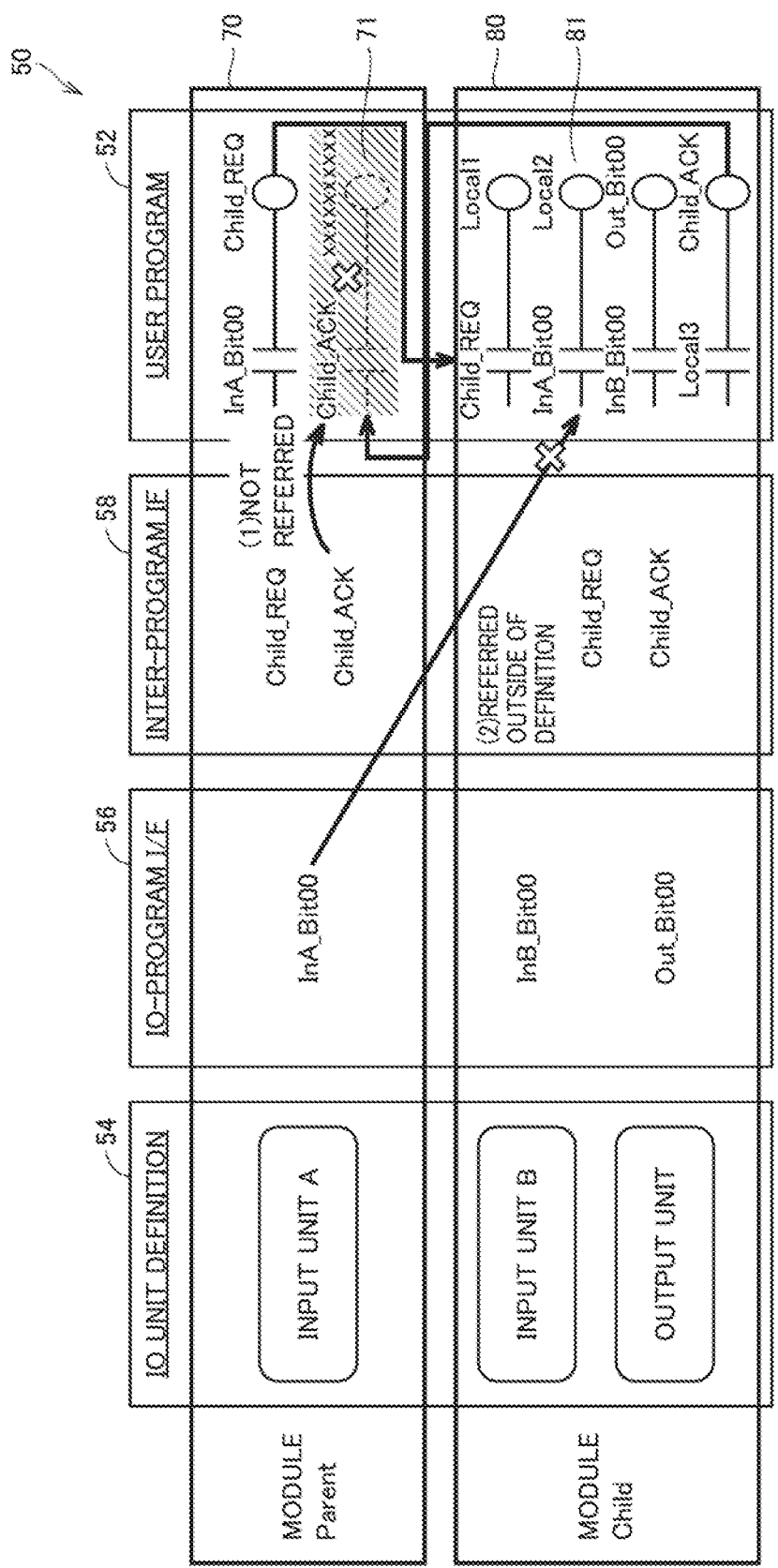
FIG. 8 is a diagram illustrating an example in which some errors are included in the project illustrated in FIG. 7.

FIG. 8 is a diagram illustrating an example in which some errors are included in project 50 illustrated in FIG. 7. In project 50 illustrated in FIG. 8, project 50 illustrated in FIG. 7 should be originally created, but it is assumed that the following two errors are included.

In parent module 70, an instruction 71 referring to variable "Child_ACK" should be included in the program, but is not described. As a result, variable "Child_ACK" defined in inter-program I/F 58 is not referred to ((1) no reference).

Variable "InA_Bit00" of input unit A defined in IO-program I/F 56 should be referred to only by parent module 70, but includes an instruction 81 referred to by child module 80. As a result, variable "InA_Bit00" defined in IO-program I/F 56 is referred to by a module different from the original module ((2) reference from outside of definition).

As described above, project 50 illustrated in FIG. 8 fails to comply with rules for IO-program I/F 56 and inter-program I/F 58.

The modular programming according to the embodiment can evaluate consistency with the rules for IO-program I/F 56 and inter-program IF 58.

By setting attributes and consistency evaluation for the variables as described above, it is possible to achieve a new mechanism capable of improving design efficiency and reusability of the user program.

d3: Global Variable Definition 90

FIG. 9 is a diagram illustrating an example of a global variable definition 90 used in the modular programming according to the embodiment. Global variable definition 90 illustrated in FIG. 9 may be created by a definition operation by the user illustrated in step S2 in FIG. 6. That is, program development device 200 executes processing of receiving setting of an attribute related to reference from a program for each of the variables used in the user program including the plurality of programs having a calling relationship (parent module 70 and child module 80).

Referring to FIG. 9, global variable definition 90 includes a variable definition section 93 including a variable name 91 designating a variable name of each global variable and a data type 92 defining a corresponding data type, an IO unit assignment definition section 94 indicating a correspondence between each global variable and IO unit, and a reference module section 96 defining a module of a reference destination. Global variable definition 90 may further include a comment section 95 that stores a (arbitrary) comment for each global variable.

As described above, in global variable definition 90, a program to be used (referred to) is set for each variable. In global variable definition 90, whether each global variable belongs to IO-program I/F 56 or inter-program I/F 58 is determined in accordance with the setting of a reference source program (that is, the presence or absence of modules and the number of modules defined in reference module section 96 in association with each global variable).

Referring to FIG. 9, program development device 200 executes processing of receiving setting of an attribute related to reference from a program for each of one or more variables used in the user program including the plurality of programs having a calling relationship. The variable belonging to IO-program I/F 56 has an attribute of being referred to by any one of the programs. The variable belonging to inter-program I/F 58 has an attribute of being referred to by all of the plurality of related programs.

d4: Consistency Evaluation

Program development device 200 analyzes the user program and evaluates consistency based on the set attribute (attribute to either IO-program I/F 56 or inter-program I/F 58) related to reference from the program for each variable included in the user program. As an example of the consistency evaluation of the user program based on global variable definition 90, processing of analyzing a variable use status for each module will be described.

FIG. 10 is a flowchart illustrating a processing procedure of the consistency evaluation in the modular programming according to the embodiment. Typically, each step illustrated in FIG. 10 is implemented by processor 202 of program development device 200 executing development tool 250. That is, development tool 250 is a program for providing program development device 200 for providing the development environment of the user program executed by control device 100. Then, program development device 200 analyzes the user program and executes processing as described below for evaluating consistency based on the set attribute related to reference from the program for each of the variables.

Referring to FIG. 10, program development device 200 extracts a module name to be analyzed with reference to global variable definition 90 illustrated in FIG. 9 (step S100). Program development device 200 sets a program having any extracted module name as a search target (step S102). Program development device 200 reads one line of the program set as the search target (step S104), and determines whether any variable is used (step S106). When any variable is used (YES in step S106), a variable name, a use location, an input/output type, an application, and the like of the variable being used are extracted (step S108). Each piece of extracted information is output as a per-module variable use status (see FIG. 11 described later). When no variable is used (NO in step S106), the processing in step S108 is skipped.

Program development device 200 determines whether the last line of the program as the search target has been reached (step S110). When the last line of the program as the search target has not been reached (NO in step S110), program development device 200 reads the next one line of the program set as the search target (step S112), and executes the processing of step S106 and subsequent steps again.

When the last line of the program as the search target has been reached (YES in step S110), program development device 200 determines whether search processing has been completed for all the programs having the extracted module name (step S114). When there is a program for which the search processing is not completed among the programs having the extracted module name (NO in step S114), program development device 200 sets, as a new search target, the program for which the search processing is not completed (step S116). Then, program development device 200 executes the processing of step S102 and subsequent steps again.

When the search processing has been completed for all the programs having the extracted module name (YES in step S114), program development device 200 executes the processing of step S120 and subsequent steps.

FIG. 11 is a diagram illustrating an example of a per-module variable use status 350 generated by the processing of the consistency evaluation illustrated in FIG. 10. Referring to FIG. 11, per-module variable use status 350 includes a list of global variables used in the program included in a target module.

Specifically, per-module variable use status 350 includes a module name 351 indicating a module in which the corresponding variable is used, a variable name 352 of the variable being used, a use location 353 of the corresponding variable, an input/output type 354 of the corresponding variable, an application 355 of the corresponding variable, and a non-definition use 356 that stores a flag indicating that the corresponding variable is used in a module other than the defined module.

In use location 353, the use location of the corresponding variable is specified using a step number of the corresponding program or the like. Input/output type 354 indicates whether a corresponding variable is used as a contact (input variable) or a corresponding variable is used as a coil (output variable).

Note that, in step S108 in FIG. 10, the same variable may be extracted from the same program a plurality of times. However, the same variable extracted a plurality of times is merged, and the same variable is not redundantly registered in per-module variable use status 350 for the same program. Among the variables extracted in step S108 in FIG. 10, variables having no corresponding module name may be deleted.

Processing of step S120 and subsequent steps illustrated in FIG. 10 is executed with reference to per-module variable use status 350 as illustrated in FIG. 11. Referring to FIG. 10 again, program development device 200 deletes the variables included in global variable definition 90 (FIG. 9) for which a module of a corresponding reference destination (reference module section 96) is not defined, and generates a target global variable definition 90A including only the variables to be subjected to the consistency evaluation (step S120).

FIG. 12 is a diagram illustrating an example of target global variable definition 90A generated in the modular programming according to the embodiment. Referring to FIG. 12, target global variable definition 90A includes only the global variable associated with the reference module. In target global variable definition 90A, a flag for evaluating the presence or absence of use can be set for each module that refers to each global variable (reference module section 97).

Next, processing is executed in which per-module variable use status 350 illustrated in FIG. 11 is compared with target global variable definition 90A illustrated in FIG. 12 and coincidence and difference are evaluated.

Specifically, program development device 200 reads the first entry in per-module variable use status 350 (FIG. 11) (step S122), and searches for an entry having same variable name 91 included in target global variable definition 90A using variable name 352 of the read entry as a key (step S124). Then, in the searched entry of target global variable definition 90A, a flag (reference module section 97 in FIG. 12) indicating that the same module name as module name 351 of the read entry is used is set (step S126).

Subsequently, program development device 200 determines whether read module name 351 is included in reference module section 97 in the entry of target global variable definition 90A corresponding to variable name 352 of the read entry (step S128). When read module name 351 is not included in reference module section 97 (NO in step S128), program development device 200 sets a flag (non-definition use 356 in FIG. 11) indicating that the variation is used in a module outside of definition for the read entry (step S130). On the other hand, when read module name 351 is included in reference module section 97 (YES in step S128), program development device 200 skips the processing of step S130.

That is, in steps S128 and S130, when module name 351 of per-module variable use status 350 is included in reference module section 97 of target global variable definition 90A for the variable of interest, it is determined that the variable of interest is appropriately used. On the other hand, when module name 351 of per-module variable use status 350 is not included in reference module section 97 of target global variable definition 90A, it is determined that the variable of interest is incorrectly used (used in an undefined module). As described above, the consistency evaluation includes determination as to whether the variable belonging to IO-program I/F 56 is referred by a program different from the reference source program.

Program development device 200 determines whether the processing has been completed up to the last entry of per-module variable use status 350 (step S132). When the processing has not been completed up to the last entry of per-module variable use state 350 (NO in step S132), program development device 200 reads the next entry of per-module variable use status 350 (FIG. 11) (step S134), and executes the processing of step S124 and subsequent steps again.

When the processing has been completed up to the last entry of per-module variable use status 350 (YES in step S132), program development device 200 extracts a variable for which a flag has not been set in reference module section 97 of target global variable definition 90A as a variable that has not been used (step S136), and displays a result of the consistency evaluation on the basis of per-module variable use status 350 and target global variable definition 90A (step S138). As described above, the consistency evaluation includes determination as to whether the variable belonging to inter-program I/F 58 is referred to by all of the associated programs.

Then, the processing of the consistency evaluation ends. Note that processing for correcting the user program in any manner may be executed on the basis of the result of the consistency evaluation.

d5: Example of Result of Consistency Evaluation

Program development device 200 has a function of presenting the result of the consistency evaluation as described above.

FIG. 13 is a schematic diagram illustrating an example of a result of the consistency evaluation provided by program development device 200 according to the embodiment. Referring to FIG. 13, a result display screen 300 indicates the result of the consistency evaluation of the variable use status for each module based on per-module variable use status 350 (FIG. 11).

Result display screen 300 includes a used variable list 310 indicating appropriately used variables and an unused variable list 320 indicating unused variables.

Used variable list 310 includes a module name 311 indicating the target module, a variable name 312 indicating the target variable, a data type 313 indicating the data type of the target variable, IO unit assignment 314 indicating the correspondence between the target variable and the IO unit, a comment 315 (optional) on the target variable, an application 316 of the target variable, and an evaluation result 317 indicating the result of the consistency evaluation on the target.

In evaluation result 317, an error message 318 such as "use not in module definition" is displayed in association with a variable used in a module other than a module defined as a use destination (variable for which a flag is set in non-definition use 356 of per-module variable use status 350).

Similarly, unused variable list 320 includes a module name 321 indicating the target module, a variable name 322 indicating the target variable, a data type 323 indicating the data type of the target variable, IO unit assignment 324 indicating the correspondence between the target variable and the IO unit, a comment 325 (optional) on the target variable, an application 326 of the target variable, and an evaluation result 327 indicating the result of the consistency evaluation on the target. Since the target variable is unused, a valid value cannot be set for IO unit assignment 324 and application 326.

In evaluation result 327, an error message 328 such as "not used in defined module" is displayed in association with the variable not used in the defined module (variable for which a flag of reference module section 97 of target global variable definition 90A is not set).

By presenting an example of a result the consistency evaluation as illustrated in FIG. 13 to the user, it is possible to easily identify a variable that does not conform to a rule for a predetermined variable.

FIG. 14 is a schematic diagram illustrating another example of the result of the consistency evaluation provided by program development device 200 according to the embodiment. Referring to FIG. 14, result display screen 330 shows a result the consistency evaluation of the use status for each variable based on target global variable definition 90A (FIG. 12).

Result display screen 330 includes a used variable list 340 corresponding to target global variable definition 90A (FIG. 12).

Used variable list 340 includes a variable name 341 indicating the target variable, a data type 342 indicating the data type of the target variable, IO unit assignment 343 indicating the correspondence between the target variable and the IO unit, a comment 344 (optional) on the target variable, a per-module use state 345 indicating a use state of the target variable in the module, and an evaluation result 348 indicating the result of the consistency evaluation on the target.

Per-module use state 345 includes a definition 346 indicating the presence or absence of a definition of use in each module and a use 347 indicating whether the variable is actually used in each module. In definition 346, an evaluation mark is displayed when use of the target variable is defined in the corresponding module. Furthermore, in use 347, information indicating in what configuration the target variable in the corresponding module is used is displayed. [R] is displayed when the corresponding variable is used as a contact (input variable), and [W] is displayed when the corresponding variable is used as a coil (output variable). That is, program development device 200 presents which type (input/output) of input and output each variable is used in the user program.

In per-module use state 345, a variable that does not conform to a predetermined rule for the use of variables is coordinately displayed in a display mode different from the other variables. The example illustrated in FIG. 14 shows that variables "InA_Bit00" and "Child_ACK" do not conform to the rule for use.

In evaluation result 348, details that do not conform to the rule are displayed. In the example illustrated in FIG. 14, error messages such as "use not in module definition" and "access to units in a plurality of modules" are displayed in association with variable "InA_Bit00". Further, an error message such as "not used in defined module" is displayed in association with variable "Child_ACK".

As described above, program development device 200 displays the variable evaluated as not satisfying the consistency in the consistency evaluation in a mode different from other variables.

By presenting an example of a result the consistency evaluation as illustrated in FIG. 14 to the user, it is possible to easily identify a variable that does not conform to a rule for a predetermined variable.

E. Modification

The above description has been given focusing on IO-program I/F 56 that defines the global variable referred to for the access from each program to the IO unit and inter-program I/F 58 that defines the global variable accessible between the programs. Inter-program I/F 58 only defines that the global variable can be referred between programs (modules), but may further set an attribute (or rule) of the global variable that can be referred between programs (modules) in consideration of the calling relationship (parent-child relationship) between the programs (modules).

FIG. 15 is a diagram illustrating an example of an inter-module interface in a modular programming according to a modification of the embodiment. Referring to FIG. 15(A), it is assumed that a parent-child relationship calling two child modules 80A and 80B (child) from parent module 70 (parent) is set. For such three modules, there may be three types of inter-module interfaces, which are a relationship between parent module 70 and child module 80A, a relationship between parent module 70 and child module 80B, and a relationship between child module 80A and child module 80B.

By using such information on the parent-child relationship between modules, consistency may be evaluated as to whether there is a variable as an inter-module interface other than the parent-child relationship.

For example, as illustrated in FIG. 15(B), IF_Parent_Child1 can be defined as an inter-module interface between parent module 70 and child module 80A, IF_Parent_Child2 can be defined as an inter-module interface between parent module 70 and child module 80B, and IF_Child1_Child2 can be defined as an inter-module interface between child module 80A and child module 80B.

That is, by enabling definition of the variable belonging to the interface between child modules called IF_Child1_Child2 with reference to the parent-child relationship between modules, consistency of reference of variable between the child modules can be evaluated. Then, it is possible to notify the user of such a variable that does not match the attribute (or rule) of the variable.

Whether to define a relationship other than the parent-child relationship between modules (that is, the interface between the child modules) may depend on a rule of module design of the user. In this case, the user may arbitrarily select (that is, switch between valid and invalid) whether to define a relationship other than the parent-child relationship between the modules.

F. Appendix

The above embodiment includes the following technical ideas.

Configuration 1

A program development device (200) configured to provide a development environment of a user program executed by a control device (100), the program development device including:
  a setting means (90; S2) configured to receive setting of an attribute related to reference from a program for each of one or more variables used in a user program including a first program and a second program that have a calling relationship, the attribute to be set including a first attribute (56) referred to by any one of the first program and the second program and a second attribute (58) referred to by both the first program and the second program; and
  an evaluation means (S100 to S138) configured to analyze the user program and evaluate, for each of the one or plurality of variables, consistency based on the attribute having been set and related to reference from the program.

Configuration 2

The program development device according to Configuration 1, wherein evaluation of consistency by the evaluation means includes whether a variable in which the first attribute is set is referred to by a program different from a reference source program.

Configuration 3

The program development device according to Configuration 1 or 2, wherein the evaluation of consistency by the evaluation means includes whether a variable in which the second attribute is set is referred to by both the first program and the second program.

Configuration 4

The program development device according to any one of Configurations 1 to 3, further including a result presentation means (300; 330) configured to present an evaluation result of consistency by the evaluation means.

Configuration 5

The program development device according to Configuration 4, wherein the result presentation means displays the variable evaluated as not satisfying consistency by the evaluation means in a mode different from other variables.

Configuration 6

The program development device according to Configuration 4 or 5, wherein the result presentation means presents which type of input or output each of the one or plurality of variables is used in the user program.

Configuration 7

The program development device according to any one of Configurations 1 to 6, wherein the variable in which the first attribute is set is associated with a specific IO unit.

Configuration 8

The program development device according to any one of Configurations 1 to 5, wherein the setting means receives setting of a program to be used for each of the one or plurality of variables.

Configuration 9

The program development device according to any one of Configurations 1 to 8, wherein each of the first program and the second program, including a variable to be used and the attribute set for the variable, is modularized.

Configuration 10

A program (250) configured to provide a program development device (200) providing a development environment of a user program executed by a control device (100), the program causing a computer to perform:
receiving setting of an attribute related to reference from a program for each of one or more variables used in a user program including a first program and a second program that have a calling relationship (S2), the attribute to be set including a first attribute (56) referred to by any one of the first program and the second program and a second attribute (58) referred to by both the first program and the second program; and
analyzing the user program and evaluating, for each of the one or plurality of variables, consistency based on the attribute having been set and related to reference from the program (S100 to S138).

G. Advantages

In the modular programming according to the embodiment, whether the variable used in the user program belongs to I/O-program I/F 56 (referred to by any one of the programs) or the variable belongs to inter-program I/F 58 (referred to by any of the plurality of related programs) can be clearly defined. Thus, whether the use mode is adapted to the defined rule can be evaluated, and a part of the use mode not adapted can be easily corrected.

As a result, high-quality modular programming can be realized, and the design efficiency and reusability of the user program executed by control device 100 can be improved.

It should be understood that the embodiment disclosed herein is illustrative in all respects and not restrictive. The scope of the present invention is defined not by the above description but by the claims, and is intended to include meanings equivalent to the claims and all modifications within the scope.

REFERENCE SIGNS LIST

1: control system, 2: field bus, 4: local network, 10: field device group, 12: remote IO device, 14: relay group, 16, 124: IO unit, 18: image sensor, 20: camera, 22: servo driver, 24: servomotor, 50: project, 52, 126: user program, 53: device program, 54, 346: definition, 55: IO unit setting, 56: IO-program I/F, 57, 59, 90: global variable definition, 58: inter-program I/F, 60: device module, 62, 66: process module, 63, 64, 67: in-process module, 70: parent module, 71, 81: instruction, 72, 82: transfer, 80, 80A, 80B: child module, 90A: target global variable definition, 91, 312, 322, 341, 352: variable name, 92, 313, 323, 342: data type, 93: variable definition section, 94: assignment definition section, 95: comment section, 96, 97: reference module section, 100: control device, 102, 202: processor, 104: chipset, 106, 206: primary storage, 108, 208: secondary storage, 110, 214: local network controller, 112, 212: USB controller, 114: memory card interface, 116: memory card, 120: field bus controller, 122: internal bus controller, 200: program development device, 204: drive, 205: storage medium, 216: input unit, 218: display unit, 220: bus, 250: development tool, 300, 330: result display screen, 310, 340: used variable list, 311, 321, 351: module name, 314, 324, 343: assignment, 315, 325, 344: comment, 316, 326, 355: application, 317, 327, 348: evaluation result, 318, 328: error message, 320: unused variable list, 345: per-module use state, 347: use, 350: per-module variable use status, 353: use location, 354: type, 356: non-definition use, 531, 536: program, 532, 534, 537: function program, 533, 535, 538: function block, 539: local variable definition.

The invention claimed is:

1. A program development device configured to provide a development environment of a user program executed by a control device, the program development device comprising processing circuitry that is configured to at least:
receive setting of an attribute for each of one or more variables used in a user program including a first program and a second program that have a calling relationship, the attribute including a first attribute that indicates that the variable belongs to an IO-program interface and is permitted to be referred to by only one of the first program and the second program and a second attribute that indicates that the variable belongs to an inter-program interface and is permitted to be referred to by both the first program and the second program;
extract, the one or more variables used in the user program, from the user program;
for each of the one or more variables used in the user program:
when the variable has
the first attribute and is referred to by the one of the first program and the second program indicated by the first attribute, determine that consistency is satisfied for the variable, and
when the variable has the second attribute and is referred to by both the first program and the second program indicated by the second attribute, determine that consistency is satisfied for the variable; and build, using a compiler included in the processing circuitry, the user program into executable code for execution by the control device, in response to the consistency being satisfied for all of the one or more variables that have been extracted, wherein when the control device executes the user program that has been built, the variable having the first attribute is permitted by the control device to be referred to by only the one of the first program and the second program, and the variable having the second attribute is permitted by the control device to be referred to by both the first program and the second program.

2. The program development device according to claim 1, wherein the program development device is further configured to display an evaluation result of the consistency for each of the one or more variables used in the user program.

3. The program development device according to claim 2, wherein the program development device displays a variable for which consistency is not satisfied in a mode different from the variables of the one or more variables for which consistency is satisfied.

4. The program development device according to claim 2, wherein the program development device displays an input/output type of each of the one or more variables is used in the user program.

5. The program development device according to claim 1, wherein the variable in which the first attribute is set is associated with a specific IO unit.

6. The program development device according to claim 1, wherein the program development device receives setting of a program to be used for each of the one or more variables.

7. The program development device according to claim 1, wherein each of the first program and the second program, including a variable to be used and the attribute set for the variable, is modularized.

8. The program development device according to claim 1, wherein the processing circuitry comprises a dedicated hardware circuit.

9. The program development device according to claim 1, wherein the processing circuitry comprises one or more processors and a storage that stores one or more programs, wherein at least one processor of the one or more processors accesses the storage and executes the one or more programs to cause the at least one processor to receive the setting of the attribute, wherein at least one processor of the one or more processors accesses the storage and executes the one or more programs to cause the at least one processor to extract the one or more variables used in the user program, from the user program and, for each of the one or more variables:

when the variable has the first attribute and is referred to by the one of the first program and the second program indicated by the first attribute, determine that consistency is satisfied for the variable, and when the variable has the second attribute and is referred to by both the first program and the second program indicated by the second attribute, determine that consistency is satisfied for the variable, and wherein at least one processor of the one or more processors accesses the storage and executes the one or more programs to cause the at least one processor to build, using a compiler included in the program development device, the user program into executable code for execution by the control device, in response to the consistency being satisfied.

10. A non-transitory storage medium having a program stored thereon which is configured to provide a program development device providing a development environment of a user program executed by a control device, the program causing, when executed by one or more processors, the one or more processors to perform at least:

receiving setting of an attribute for each of one or more variables used in a user program including a first program and a second program that have a calling relationship, the attribute including a first attribute that indicates that the variable belongs to an IO-program interface and is permitted to be referred to by only one of the first program or the second program and a second attribute that indicates that the variable belongs to an inter-program interface and is permitted to be referred to by both the first program and the second program;

extract the one or more variables used in the user program, from the user program;

for each of the one or more variables:
when the variable has
the first attribute and is referred to by the one of the first program and the second program indicated by the first attribute, determine that consistency is satisfied for the variable, and
when the variable has the second attribute and is referred to by both the first program and the second program indicated by the second attribute, determine that consistency is satisfied for the variable; and build, using a compiler included in the program development device and executed by the one or more processors, the user program into executable code for execution by the control device, in response to the consistency being satisfied, wherein when the control device executes the user program that has been built, the variable having the first attribute is permitted by the control device to be referred to by only the one of the first program and the second program, and the variable having the second attribute is permitted by the control device to be referred to by both the first program and the second program.

11. The non-transitory storage medium according to claim 10, wherein the program causes the one or more processors to display an evaluation result of the consistency for each of the one or more variables used in the user program.

12. The non-transitory storage medium according to claim 11, wherein the program causes the one or more processors to display a variable for which consistency is not satisfied in a mode different from the variables of the one or more variables for which consistency is satisfied.

13. The non-transitory storage medium according to claim 11, wherein the program causes the one or more processors to display an input/output type of each of the one or more variables is used in the user program.

14. The non-transitory storage medium according to claim 10, wherein the variable in which the first attribute is set is associated with a specific IO unit.

15. The non-transitory storage medium according to claim 10, wherein the program causes the one or more processors to perform receiving setting of a program to be used for each of the one or more variables.

16. The non-transitory storage medium according to claim 10, wherein each of the first program and the second program, including a variable to be used and the attribute set for the variable, is modularized.

* * * * *